United States Patent [19]
Parker et al.

[11] Patent Number: 5,460,701
[45] Date of Patent: Oct. 24, 1995

[54] METHOD OF MAKING NANOSTRUCTURED MATERIALS

[75] Inventors: John C. Parker, Lisle; Mohammed N. Ali, Naperville; Byron B. Lympany, Willowbrook, all of Ill.

[73] Assignee: Nanophase Technologies Corporation, Darien, Ill.

[21] Appl. No.: 97,884

[22] Filed: Jul. 27, 1993

[51] Int. Cl.⁶ .................................................. B22F 9/14
[52] U.S. Cl. ........................ 204/164; 75/10.19; 75/10.21; 75/10.22; 75/10.23; 75/10.26; 264/82
[58] Field of Search .................................. 75/10.19, 10.2, 75/10.21, 10.22, 10.23, 10.26; 264/82; 204/164

[56] References Cited

U.S. PATENT DOCUMENTS

| | | | |
|---|---|---|---|
| 2,702,239 | 2/1955 | Gilbert et al. | 75/10.26 |
| 2,899,294 | 8/1959 | Siemons | 75/10.19 |
| 2,979,449 | 4/1961 | Sheer et al. | 75/10.19 |
| 3,752,610 | 8/1973 | Glazunov et al. | 425/6 |
| 3,783,167 | 1/1974 | Tylko | 75/10.19 |
| 3,863,074 | 1/1975 | O'Hanlon et al. | 204/164 |
| 3,887,667 | 6/1975 | Clark | 264/8 |
| 4,058,698 | 11/1977 | Bykhovsky et al. | |
| 4,367,393 | 1/1983 | Yerushalmy et al. | |
| 4,482,134 | 11/1984 | Uda et al. | 266/217 |
| 4,610,857 | 9/1986 | Ogawa et al. | 423/335 |
| 4,642,207 | 2/1987 | Uda et al. | 264/10 |
| 4,732,369 | 3/1988 | Araya et al. | 266/207 |
| 4,881,722 | 11/1989 | Koizumi et al. | 266/176 |
| 4,889,665 | 12/1989 | Uda et al. | 264/10 |
| 4,909,840 | 3/1990 | Schlump | 75/232 |
| 4,982,067 | 1/1991 | Marantz et al. | 219/121.47 |
| 5,112,388 | 5/1992 | Schulz et al. | 75/255 |
| 5,128,081 | 7/1992 | Siegel et al. | 264/81 |
| 5,147,449 | 9/1992 | Grewe et al. | 75/354 |
| 5,149,596 | 9/1992 | Smith et al. | 428/656 |
| 5,194,128 | 3/1993 | Beaty et al. | 204/164 |
| 5,352,269 | 10/1994 | McCandlish et al. | 75/351 |

FOREIGN PATENT DOCUMENTS

| | | | |
|---|---|---|---|
| 0124901 | 11/1984 | European Pat. Off. | 204/164 |
| 59-85808 | 5/1984 | Japan | 204/164 |
| 60-039134 | 2/1985 | Japan | 75/10.26 |
| 60-024333 | 2/1985 | Japan | 75/10.19 |
| 63-267431 | 11/1988 | Japan | 204/164 |
| 4281840 | 10/1992 | Japan | 204/164 |

OTHER PUBLICATIONS

Everest et al., "Preparation of Ultrafine alumina Powders by Plasma Evaporation", Journal of Materials Science 6 (1971) pp. 218–224.

*Primary Examiner*—Allan R. Kuhns
*Attorney, Agent, or Firm*—Michael D. Rechtin

[57] ABSTRACT

A method and system for synthesizing nanocrystalline material. A system includes a chamber, a nonconsumable cathode shielded against chemical reaction by a working gas not including an oxidizing gas, but including an inert gas, a consumable anode vaporizable by an arc formed between the cathode and the anode, and a nozzle for injecting at least one of a quench and reaction gas in the boundaries of the arc.

29 Claims, 7 Drawing Sheets

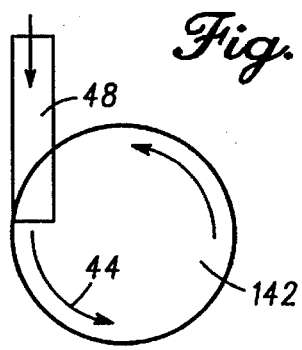
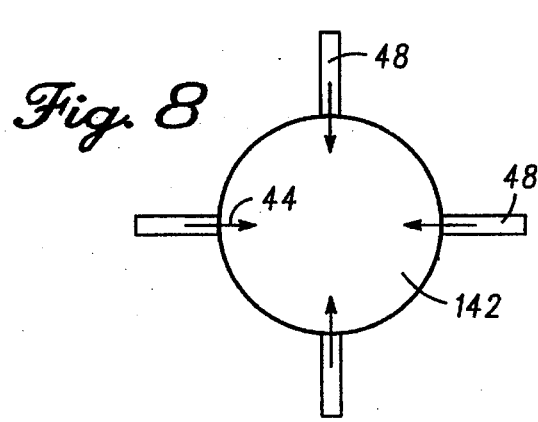
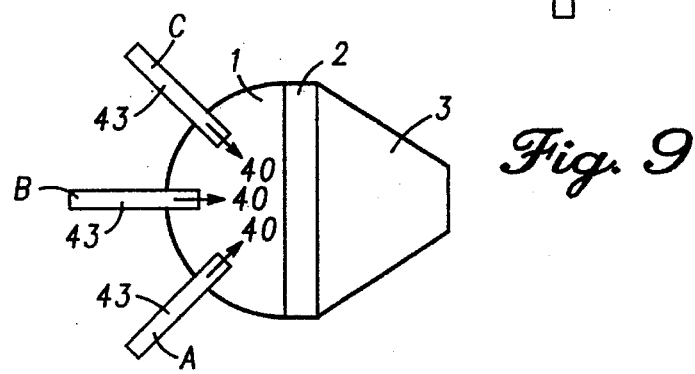
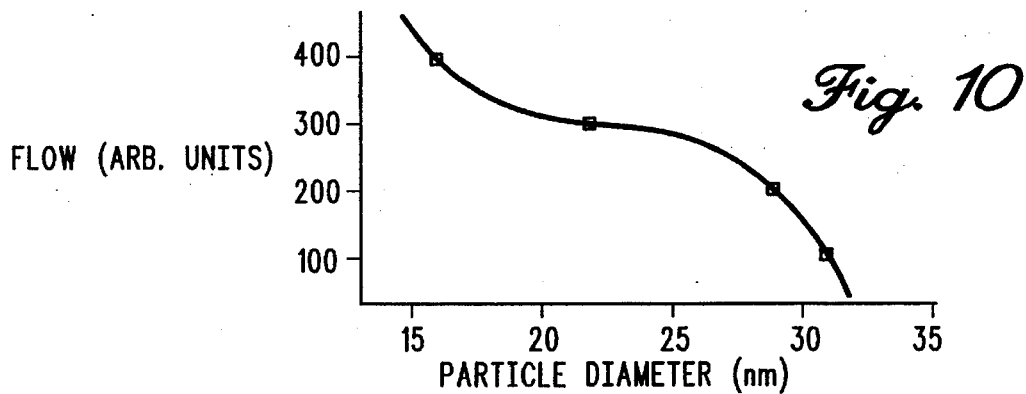
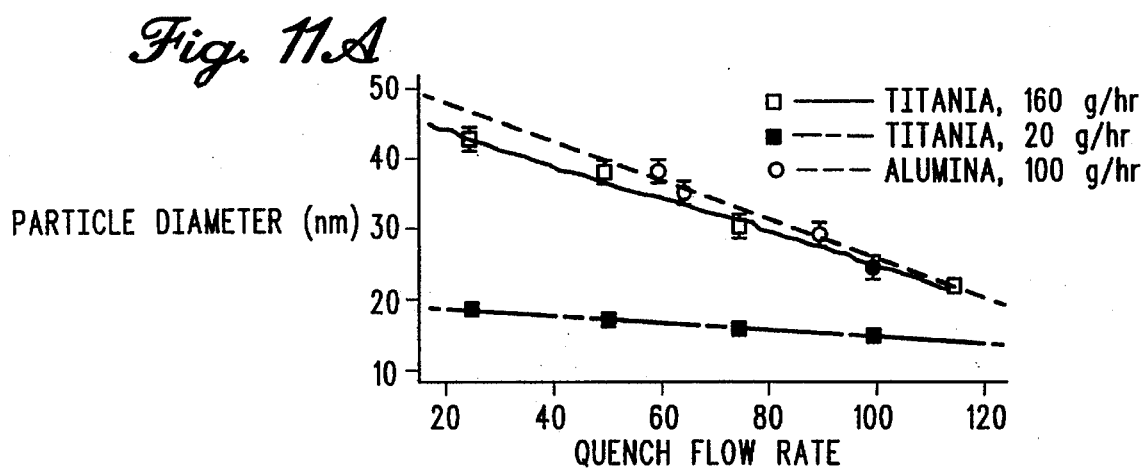

□ ——— NITROGEN
○ - - - HYDROGEN

METHOD OF MAKING NANOSTRUCTURED MATERIALS

The present invention is concerned generally with a method of making a nanostructured material. More particularly, the invention is concerned with a method of making a variety of stoichiometric-nanostructured materials by controlling the working gas composition in a plasma arc system. The production rate of nanostructured material can also be substantially enhanced by combining $N_2$ or $H_2$ gas with Ar working gas.

In the recent past, it has been shown that nanostructured materials exhibit enhanced or unique properties compared to typical polycrystalline materials. For example, metallic nanostructured materials can be sintered at low temperatures but exhibit higher hardness and yield strength than polycrystalline metallic materials. Ceramic nanostructured materials exhibit much greater ductility at low temperatures compared to conventional ceramic materials. In order to manufacture such nanostructured materials, it is necessary to control the particle size and chemical stoichiometry. However, in order to prepare commercial quantities of these nanostructured materials, the process must also allow rapid production while controlling the chemistry and particle size. Current methods of manufacture do enable some control of particle size but cannot reliably control the chemical stoichiometry or rapidly manufacture the material in large quantities while also controlling the particle size and stoichiometry.

It is therefore an object of the invention to provide an improved method and article of manufacture of nanostructured material.

It is also an object of the invention to provide a novel method of manufacturing a nanostructured material of controlled stoichiometry.

It is another object of the invention to provide an improved method of producing large quantifies of nanostructured materials of well controlled particle size and chemical stoichiometry.

It is a further object of the invention to provide a novel article of manufacture of nanostructured material of well defined, very small grain size.

It is an additional object of the invention to provide an improved method and article of manufacture of nanostructured gamma ferrite.

It is still another object of the invention to provide a novel method of manufacturing a nanostructured material of controlled particle size using working gas mixtures of argon and nitrogen and/or hydrogen and/or a carbon containing gas.

It is yet a further object of the invention to provide an improved method of controlling nanostructured grain size by controlling the amount and variety of quench gas injected into a reaction zone of a plasma arc system.

It is yet an additional object of the invention to provide a novel method of controlling manufacture of nanostructured material by control of color and intensity of light output by the reaction zone, cathode zone and anode zone of a plasma arc system.

It is also a further object of the invention to provide an improved method of generating stoichiometric $Al_2O_3$, $ZrO_2$, $TiO_2$ and $Fe_2O_3$ and nanostructured material.

It is still an additional object of the invention to provide a novel method of controlling production of nanostructured material by controlled adjustment of working gas and quench gas injection location in a plasma arc system.

It is yet another object of the invention to provide an improved method of controlling pore size distribution and pore size spacing of a nanostructured material.

These and other objects and advantages of the invention will become apparent from the following description including the drawings described hereinbelow.

BRIEF DESCRIPTION OF THE DRAWINGS

FIG. 7 illustrates a top view of a nozzle for turbulent mixing of a nanocrystal aerosol using tangentially injected gas and FIG. 8 shows the mixing nozzle with radially injected gas;

FIG. 9 is a mixing nozzle for receiving nanocrystalline aerosol from a plurality of sources;

FIG. 10 is a graph of quench/reaction gas flow rate into a mixing nozzle versus nanocrystalline particle diameter;

FIG. 11A is a graph of nanocrystalline particle size versus gas quench flow rate into the plasma tail flame.

DETAILED DESCRIPTION OF PREFERRED EMBODIMENTS

Figure 1:
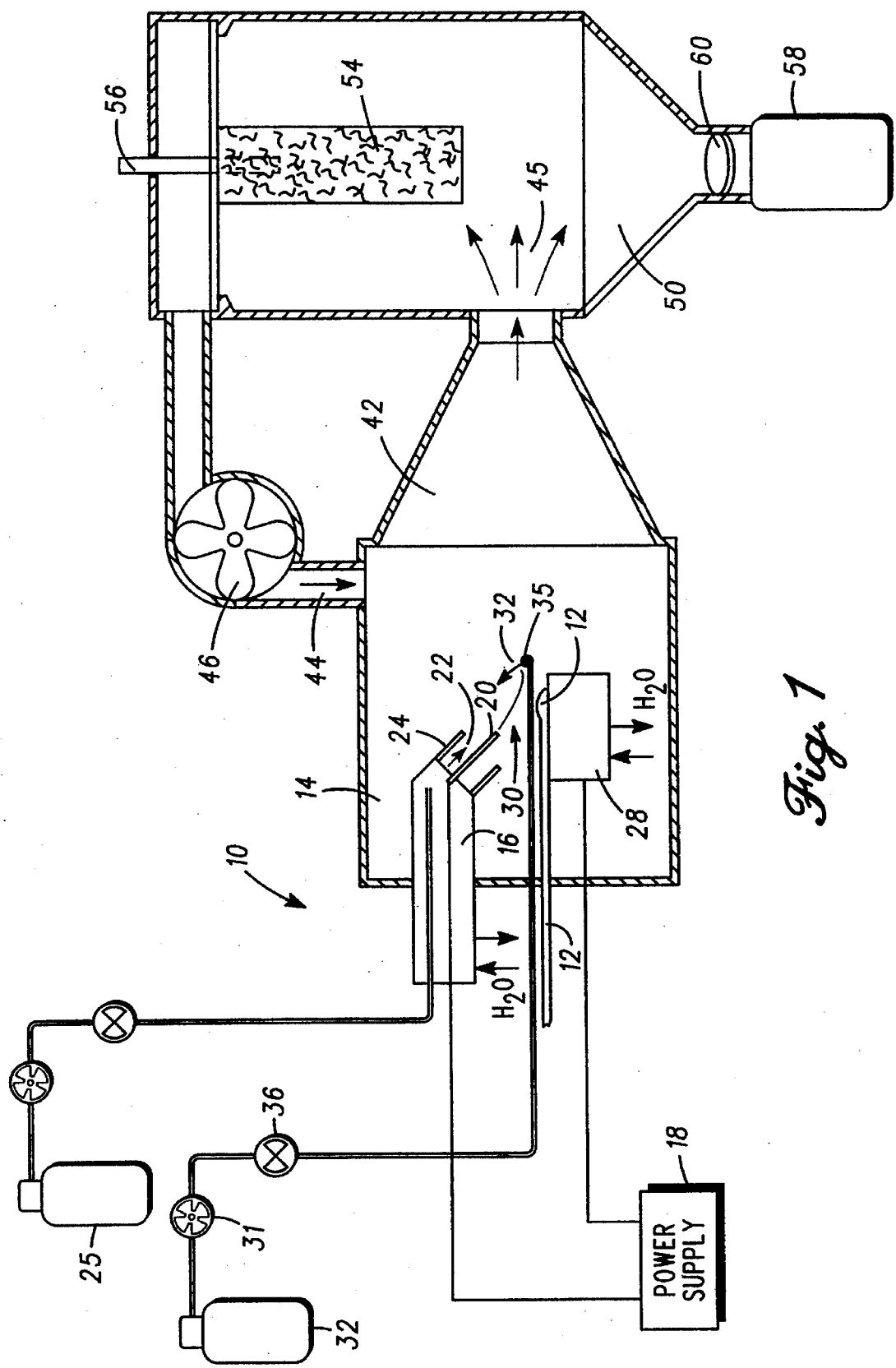
FIG. 1A is one embodiment of a plasma arc system constructed in accordance with the invention and FIG. 2 is another embodiment of the system.

A plasma arc system constructed in accordance with the invention is shown generally in FIG. 1 at 10. The preparation of nanostructured, or nanocrystalline, material begins with the vaporization of a high purity precursor material 12 in a chamber 14 via an arc generated, for example, by a water-cooled TIC (tungsten inert gas) torch 16 driven by a power supply 18. The interior of the chamber 14 is preferably maintained at a relative pressure of about 20 inches of mercury vacuum up to +3 psi positive pressure (absolute pressure 250 torr to 1000 torr).

The precursor material 12 is melted and vaporized by the transfer of arc energy from a nonconsumable electrode, such as a tungsten electrode 20 with 2% thorium oxide. The nonconsumable tungsten electrode 20 is shielded by a stream of an inert working gas 22 from reservoir 25 to create the arc. The working gas 22 acts to shield the nonconsumable tungsten electrode 20 from an oxidizing environment and then becomes a working plasma gas when it is ionized to a concentration large enough to establish an arc. The inert working gas 22 preferably contains argon and is directed by a water cooled nozzle 24 attached to the torch 16.

The consumable precursor material 12 is, for example, in the form of a rod which has a diameter of 0.0625" to 2" diameter and is fed horizontally (see FIG. 1A) or vertically (see FIG. 2) relative to the nonconsumable tungsten electrode 20. The feed rod precursor material 12 is continuously fed to allow a stable arc and continuous production of nanocrystalline material. A continuous production is preferred over batch operation because the process can be run on a more consistent basis. The precursor material 12 is electrically grounded and cooled by a copper anode 28, and the precursor material 12 is given both translational and rotational motion.

Figure 2:
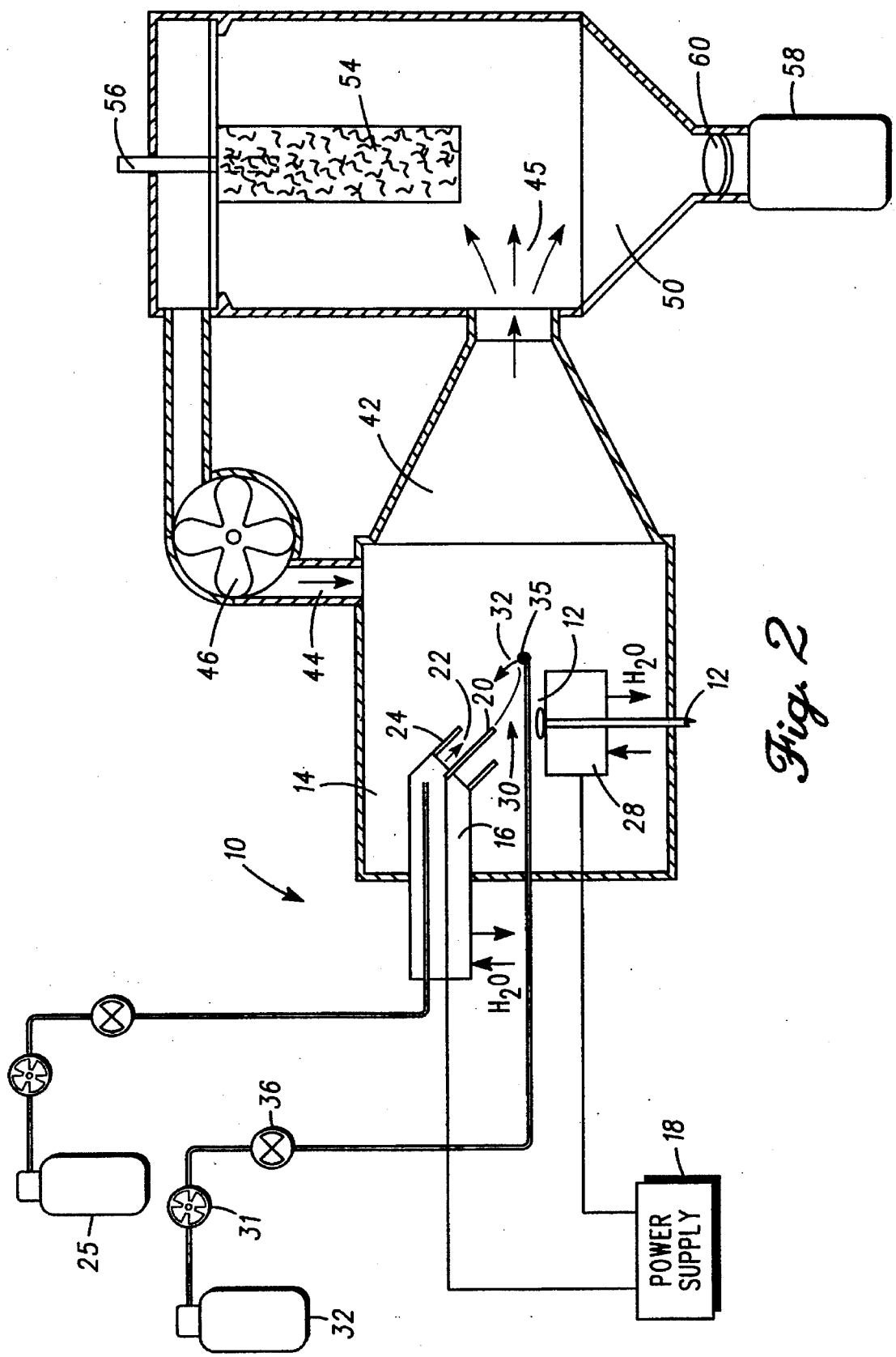
Figures 3, 4:
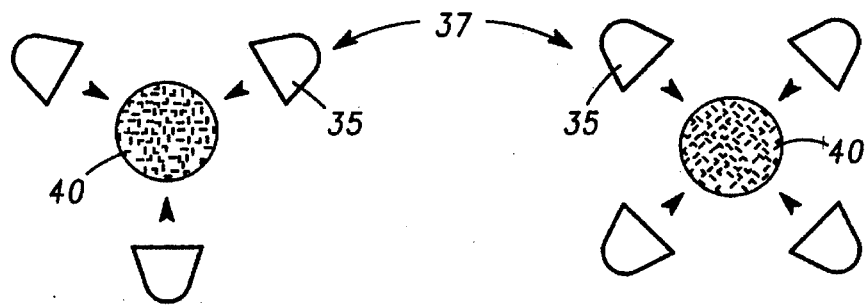
FIG. 3 illustrates one embodiment of gas injection nozzles for the plasma arc system and FIG. 4 shows another gas injection nozzle embodiment.

The nonconsumable tungsten electrode 20 is preferably inclined at an angle so as to create an elongated arc plasma tail flame 30. Depending on the current level, the plasma tail flame 30 can be about one to several inches long. The plasma tail flame 30 acts as a high temperature gradient furnace into which the vaporized precursor material 12 is injected along with a quench and/or reaction gas 32 (hereinafter, "quench/reaction gas"), if desired, through the nozzle 35. The amount of the quench/reaction gas 32 injected into the plasma tail flame 30 is controlled by a flow meter 36 having regulator 31 as in the case of the working gas reservoir 25. A concentric gas injection geometry is established around the plasma tail flame 30 to allow homogeneous insertion of the quench/reaction gas 32. Preferably the nozzle 35 is one of an arrangement of nozzles 37 as shown in FIGS. 3 or 4. The quench/reaction gas nozzles 37 can be positioned at any point along the length of the plasma tail flame 30 as shown in FIG. 1 or FIG. 2. The insertion location of the quench/reaction gas 32 can act to truncate the length of the plasma tail flame 30 and allow control of the manufacturing process. The quench and reaction gas composition preferably is one of oxygen, nitrogen, helium, air or combinations of these gases.

Figure 5A:
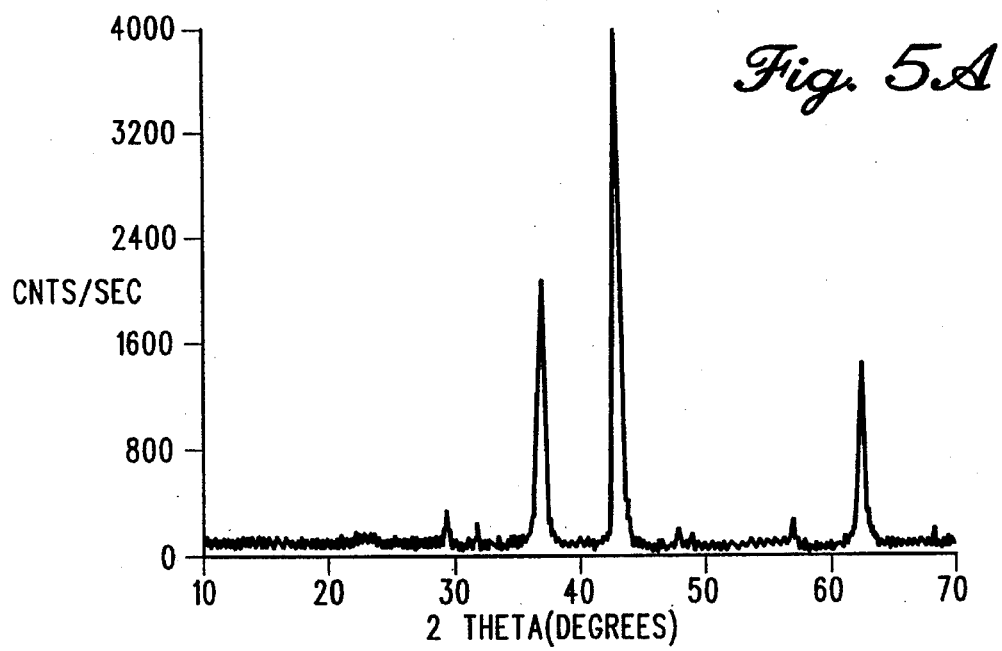
FIG. 5A shows an X-ray diffraction plot of a TiN nanostructured material and FIG. 5B shows an X-ray plot of a $TiO_2$ nanostructured material.
Figure 5B:
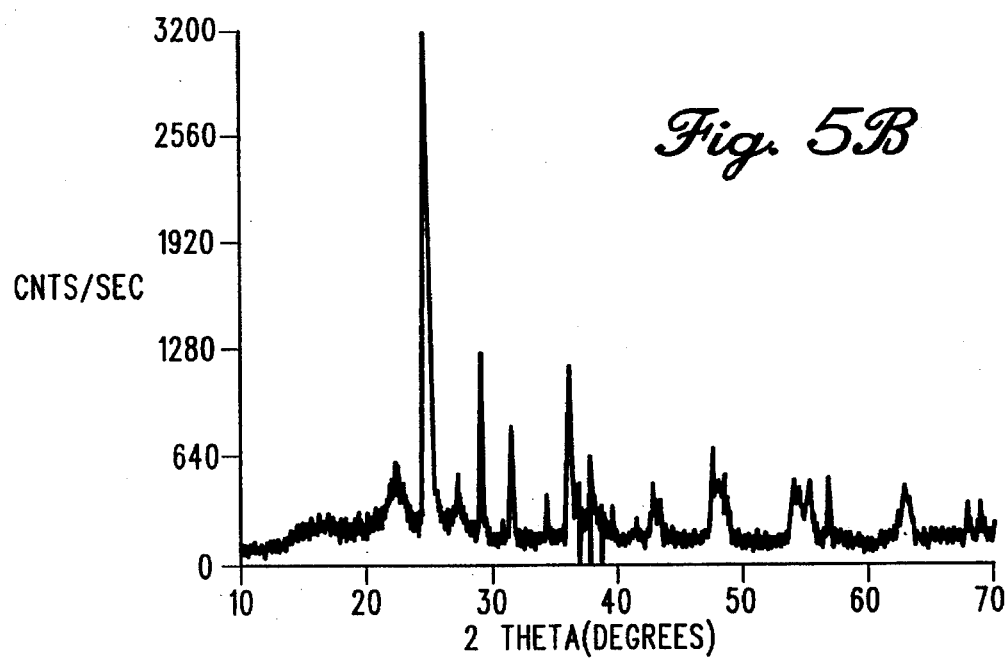

The plasma arc system 10 can be used to manufacture a variety of nanostructured material. For example, titanium metal vapor in the plasma tail flame 30 can be reacted with nitrogen gas to form 8–25 nm TiN nanocrystals. Titanium metal can also be reacted with oxygen gas to form 5–40 nm $TiO_2$ nanocrystals (see the Examples). X-ray diffraction data of the two Ti based ceramic materials TiN (FIG. 5A) and $TiO_2$ (FIG. 5B) show that two distinct materials are formed using the plasma tail flame 30 as a reaction zone. Transmission electron microscopy also shows distinctly different morphologies for the two materials.

Figure 6A:
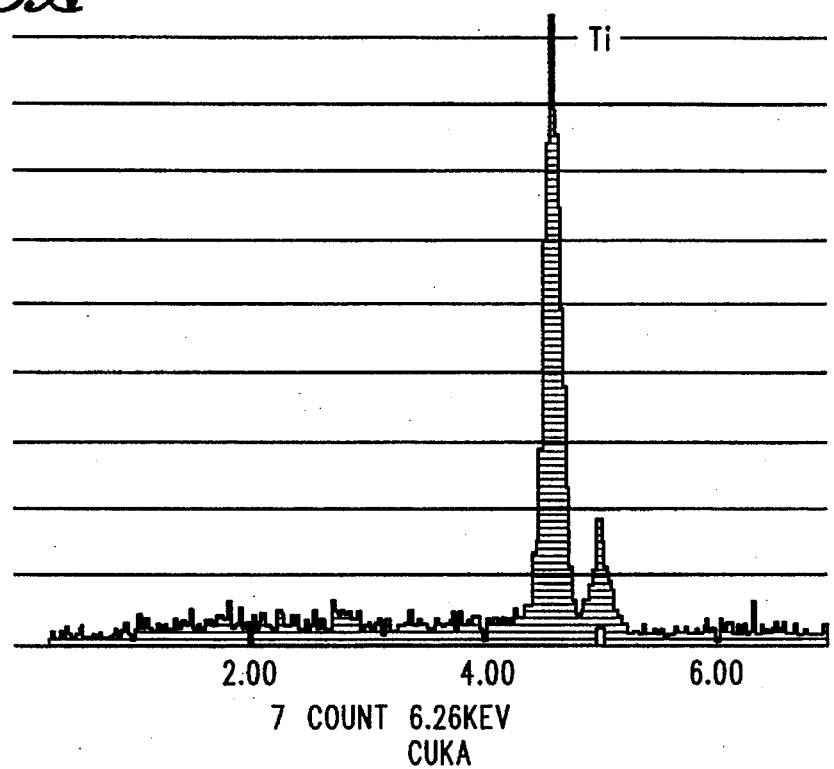
FIG. 6A is an energy dispersive X-ray analysis output for a titanium oxide prepared without oxygen present in the working arc and FIG. 6B for a titanium oxide prepared with oxygen in the working gas.
Figure 6B:
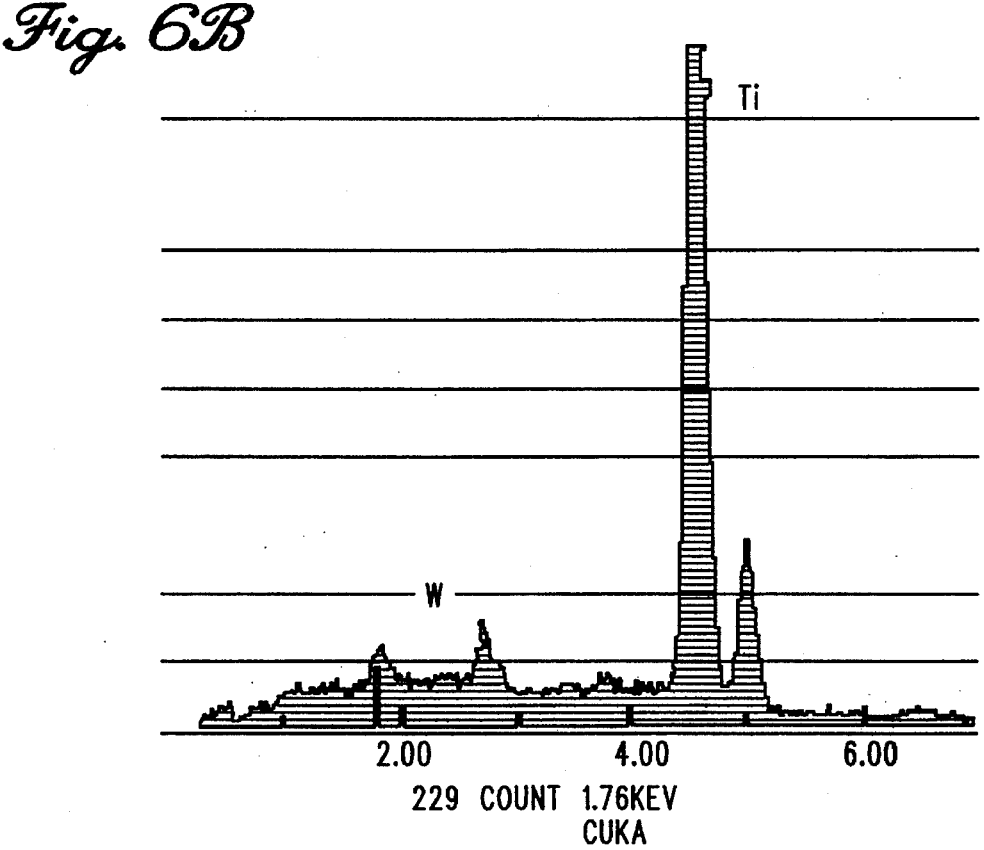

To increase the temperature gradient in the plasma tail flame 30 and increase its length, a dissociable inert gas (such as, nitrogen, hydrogen or both) can be mixed (1"70%) with the working gas 22 which shields the nonconsumable tungsten electrode 20. A higher temperature in the plasma tail flame 30 allows for a more complete reaction of the precursor material 12 with the reaction gas 32. In addition, control of the point of injection can be used to control the completeness of reaction of the precursor material 12. The large temperature gradient also can control the nanocrystal formation (size and distribution) and the degree to which the nanocrystals agglomerate. Unlike prior art (such as in U.S. Pat. No. 4,732,369), dissociable oxygen gas is most preferably not used in the working gas (termed "pinch gas" in U.S. Pat. No. 4,732,369) because it causes erosion of the nonconsumable tungsten electrode 20 and generates tungsten impurities in the final product. FIG. 4 shows an energy dispersive X-ray analysis of material made without (FIG. 6A) and with (FIG. 6B) 0.5% oxygen present in the working gas 22. It is apparent that even a small amount of oxygen (>0.5%) in the working gas 22 can cause tungsten impurities at levels of about 0.2% in the final product. Inductively coupled plasma mass spectrometry impurity analysis shows that the materials made by this process, and not using oxygen in the working gas 22, are very pure. Table 1 shows the typical impurities present in materials made by this preferred method.

TABLE 1

| % mass impurities in $Al_2O_3$ (99.9092%) | | | | | | | |
| --- | --- | --- | --- | --- | --- | --- | --- |
| Na | Mg | Si | K | Ca | Ti | Fe | Cu |
| 0.0063 | 0.0038 | 0.018 | 0.0051 | 0.0094 | 0.0010 | 0.0400 | 0.0072 |
| % mass impurities in $TiO_2$ (99.9226%) | | | | | | | |
| Al | Mn | Si | K | Ca | Ni | Fe | Cu |
| 0.0233 | 0.0021 | 0.0047 | 0.0051 | 0.0048 | 0.0052 | 0.0290 | 0.0032 |

Once a nanocrystal aerosol 40 (see FIG. 3 or FIG. 4) is formed by the quench/reaction gas 32, the agglomeration of the nanocrystals takes place. At this point the aerosol 40 is turbulently mixed in a reducing cone-shaped nozzle 42 to prevent further agglomeration. Recirculated gas or room air 44 is introduced by blower 46 into the cone-shaped nozzle 42. The recirculated gas 44 can be injected into the nozzle 42 radially (see FIG. 8) or tangentially (FIG. 7) by a gas inlet head 48. The swirling motion of the gas 44 generated in the cone-shaped nozzle 42 mixes and dilutes the aerosol 40 with the cool recirculated gas 44 to prevent further agglomeration of the nanocrystals. The cone-shaped nozzle 42 can also be used to blend and homogenize the nanocrystal aerosol 40 generated by one or more sources 43 as shown in FIG. 9. The sources 43 can be of the same material to increase production rates or individual sources generating a different material allowing the formation of composites.

As best seen in FIG. 1 or FIG. 2, after leaving the cone-shaped nozzle 42, a mixed aerosol 45 is rapidly expanded into a large volume collector housing 50 by the action of the blower 46. The expansion of the gas allows further cooling of the aerosol 45. A temperature decrease of several hundred degrees has been measured after expansion of the gas. The large collector housing 50 contains a filtering media 54. The filtering media 54 traps the weakly agglomerated nanocrystals, and the gases are separated through the filtering media 54 by the blower 46. The nanocrystals remain on the filtering media 54 until they are released by a gas pulse from gas jet source 56. The filtering media 54 can be porous sintered metal or cloth fibers with a temperature resistant coating. The agglomerated nanocrystals behave as conventional powders; and once freed from the filtering media 54, the powders are gravitationally collected in a storage vessel 58 through a valve 60.

Figure 11B:
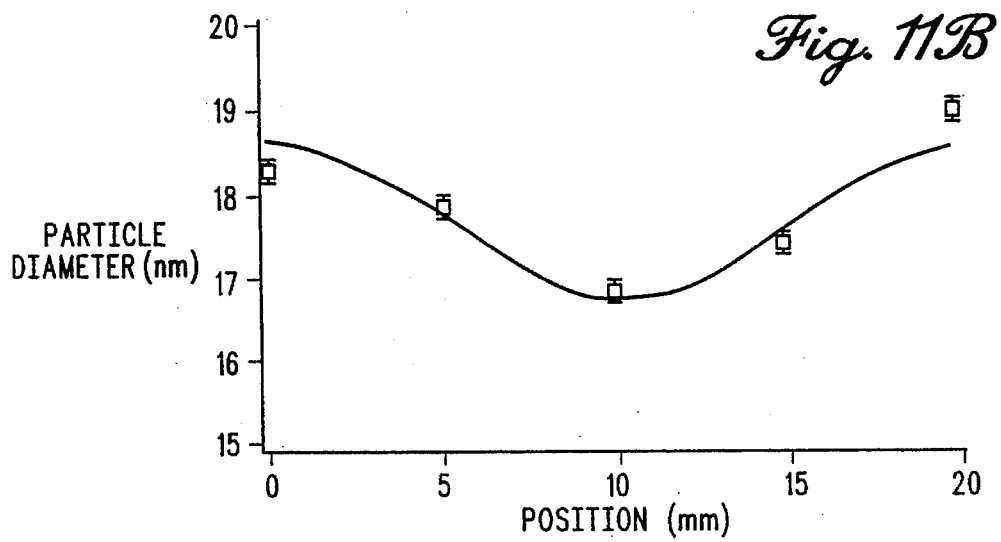
FIG. 11B is the nanocrystalline particle size versus quench/reaction gas injection point relative to the molten anode position.
Figure 11C:
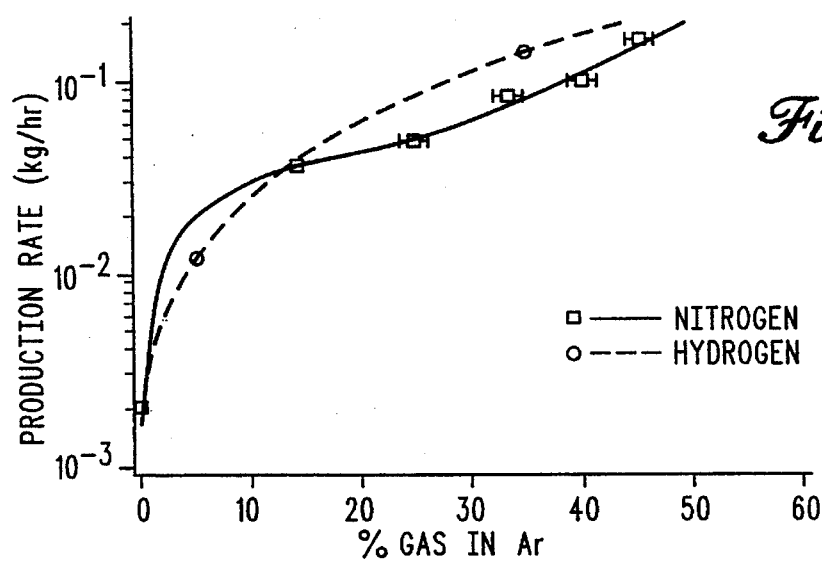
FIG. 11C is titania production rate.

The quality of the nanostructured material (average particle size, size distribution, purity and degree of agglomeration) can be controlled by the point at which the quench/reaction gas 32 is injected, and the dilution of the nanocrystal aerosol 40 can be made soon after formation of the particles. In FIG. 10 is shown the agglomerate particle size versus the flow amount of the gas 44 that is radially or tangentially injected into the cone-shaped mixing nozzle 42. In many instances the quench/reaction gas 32 can be injected at the same point depending on the arc current and precursor material. The quench/reaction gas 32 is preferably injected into the plasma tail flame 30 at the point where the temperature is such that nucleation and condensation have their onset. At any point in the plasma tail flame 30 there is a balance between condensation and evaporation of the embryonic crystallites. Analytically, this critical particle size is expressed with the following temperature and material property dependence, $$d_c = \frac{4\gamma V_a}{kT\ln(p_v/p_o)}$$

where $d_c$ is the critical particle diameter, $\gamma$ is the surface tension (N/m), $V_a$ is the atomic volume (m$^3$), k is Boltzman's constant ($1.38\times10^{-23}$ J/K), T is the temperature (K), and $P_v$ and $P_o$ are the actual and equilibrium vapor pressure (N/m$^2$). Without limiting the scope of the claims, these particles are believed to act as monomers for growth into large particles via coalescence with other monomers or small particles. The amount of coalescence growth is dependent on the number of collisions the monomers experience. Because the temperature gradient is very large in the plasma tail flame 30, the vapor and the forming particles move with great velocity. The velocity in the plasma tail flame 30 is highly dependent on the arc characteristics, $$v = \left(\frac{\mu_o I J}{2\pi\rho}\right)^{1/2}$$

where v is the velocity (m/s), 1 is the arc current (A), J is the current density (A/m$^2$), $\mu_o$ is the free space permeability ($1.256\times10^{-8}$ N/A$^2$), $\rho$ is the vapor density (kg/m$^3$). Critical particles can be cooled quickly by injecting the quench/reaction gas 32 at the appropriate location where the monomers form, and the number of monomer collisions can be reduced by dilution with an optimal amount of the quench/reaction gas 32. This control measure can allow achievement of the desired small particle size. Because the velocity component varies as $r^{-1/2}$, the amount of the quench/reaction gas 32 injected can become more important than the point of gas injection. However, as production rates increase (and hence vapor density increases), both the amount and location of injection of the quench/reaction gas 32 become important. In FIG. 11A is shown the average particle size as a function of the flow amount of the quench/reaction gas 32 injected into the plasma tail flame 30, and FIG. 11B illustrates the effect of the injection location of the quench/reaction gas 32 upon the nanocrystalline particle diameter.

The reaction gas can be introduced with the quench gas or separately in order to form an oxide, carbide or nitride from the metallic or semiconducting precursor material (e.g., precursor Si can be used to form $SiO_2$, $Si_3N_4$, or SiC). Introducing the reaction gas with the quench gas into the plasma tail flame 30 allows the formation of a higher melting point material which enhances the quenching process and enhances the formation of small nanocrystal particles. Also, using a dissociable gas, for example, $H_2$ or $N_2$, in the working gas 22 allows the plasma tail flame 30 to reach a higher temperature which allows a more complete reaction of the precursor vapor.

When pure argon is used as the working gas 22 and oxygen is used as the reaction gas 32 and injected into the plasma tail flame 30, a substoichiometric (oxygen deficient) metal oxide nanocrystal product is formed. The substoichiometry can be detected by Raman spectroscopy, X-ray diffraction or thermo gravimetric analysis. The substoichiometric material requires post processing to achieve complete oxidation. The post processing usually involves annealing the powder at high temperature in air. This step often increases the degree of agglomeration and causes particles to grow in size. With the addition of 5–50% hydrogen to the working gas 22 (particularly Ar gas), the formed nanocrystal product can be made fully stoichiometric; and the product requires no post processing. This gas mixture reduces cost in manufacturing the nanostructured material and allows the formation of a weakly agglomerated material. The effect this has on particle size is quite substantial. By fully reacting the material during synthesis, nanocrystals are weakly agglomerated and range in size from 15–20 nanometers, whereas those particles that require post reaction will in general end up being 30–50 nanometers in diameter.

The nanocrystals formed by the process described herein can be tested for their ability to form a nanostructured material. There are various techniques for making ultrafine, nanometer sized particles; however, the degree of agglomeration is critical when bulk nanostructures or nanometer dispersions are desired. If agglomeration is too strong, practical mechanical forces are not sufficient to break down the agglomerates into primary or near primary particles. A high energy process like ball milling can be used to break down the particles. However, the ball milling step often introduces contaminants into the material and reduces purity.

Two techniques are commonly used to measure particle sizes in the nanometer range; transmission electron microscopy (TEM) and BET surface area measurements. TEM yields a visual inspection of the individual crystallites that agglomerate into particles and BET infers an average particle size from a surface area measurement using the formula, $$d = \frac{6}{\rho S}$$

where d is the mean particle diameter, p is the specific gravity of the material (kg/m$^3$) and S is the measured specific surface area (m$^2$/gm). If the crystallites are weakly agglomerated, forming small necks between the crystallites, and the crystallites are equiaxed, nearly spherical in shape, then TEM and BET average particle sizes should be nearly identical. The average TEM crystallite size, and the average BET particle size should be within 30% of each other in order to have weak enough agglomeration to form a nanostructured material. The nanocrystals generated in the process show a much smaller average size and a narrow size distribution relative to other prior art methods for making nanocrystalline materials (i.e., U.S. Pat. No. 4,642,207).

Table 2 shows a comparison of aluminum oxide and zirconium oxide generated by the instant process and by the process in U.S. Pat. No. 4,642,207. Although both processes use arc energy to generate a vapor of the precursor, the modifications of this instant process yield better nanocrystalline material with smaller particle size and narrower size distribution. It should also be noted that a smaller size distribution has been obtained without the addition of a high frequency induction plasma like that used in U.S. Pat. No. 4,732,369.

TABLE 2

| material | Preferred form of invention | | Uda et. al. U.S. Pat. No. 4642207 | |
| --- | --- | --- | --- | --- |
| | avg. size | width | avg. size | width |
| $ZrO_2$ | 8 | 2–25 | — | 20–200 |
| $Al_2O_3$ | 18 | 8–50 | 38 | 10–100 |

(all sizes are in nanometers)

The degree of the agglomeration in nanostructured materials can be measured by either bulk consolidation of the nanocrystals or by dispersion of the nanocrystals. Consolidation testing of the nanocrystal powders is achieved by placing a suitable amount of nanocrystalline powder into a die and punch apparatus and applying pressure in the range of 1000–40,000 psi to the punches. The resultant pellet is nanostructured if it has a pore size distribution that is similar to the grain size distribution. Materials that are optically transparent in the bulk single crystal state will also be transparent as a nanostructured material since the grains and pores of the material are much smaller than the wavelength of visible light (i.e., below 50 nm). The BET and TEM average particle sizes are shown in Table 3 along with the average pore size and distribution width. A transparent sample can be obtained by consolidating nanocrystals with a weak degree of agglomeration. An opaque sample results if prepared from nanocrystals with stronger (harder) agglomeration, forming a material with small grains, but large pores. Agglomeration is controlled by the injection location in the chamber 14 and the amount of the quench/reaction gas 32 injected, and the amount of gas injected into the cone-shaped mixing nozzle 42. This type of porosity can be difficult to remove by conventional sintering processes.

TABLE 3

| | all sizes are in nanometers | | | |
| --- | --- | --- | --- | --- |
| sample | TEM crystallite size | BET particle size | avg. pore size | pore range |
| transparent | 8 | 9 | 5 | 1–10 |
| opaque | 10 | 36 | 10 | 2–30 |

Figure 12A:
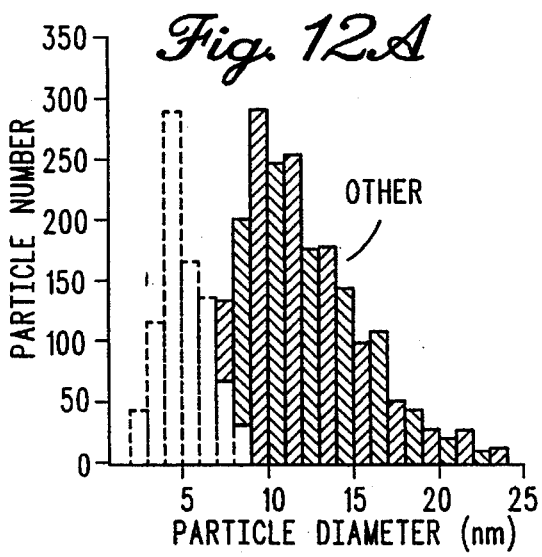
FIG. 12A shows particle size distribution for nanocrystalline material prepared in accordance with the invention as compared to a prior art method.
Figure 12B:
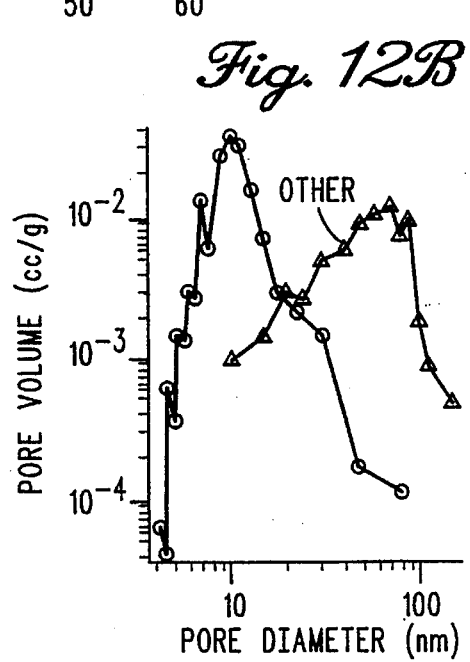
FIG. 12B illustrates pore volume versus pore diameter for nanocrystalline material prepared in accordance with the invention as compared to a prior art method.
Figure 12C:
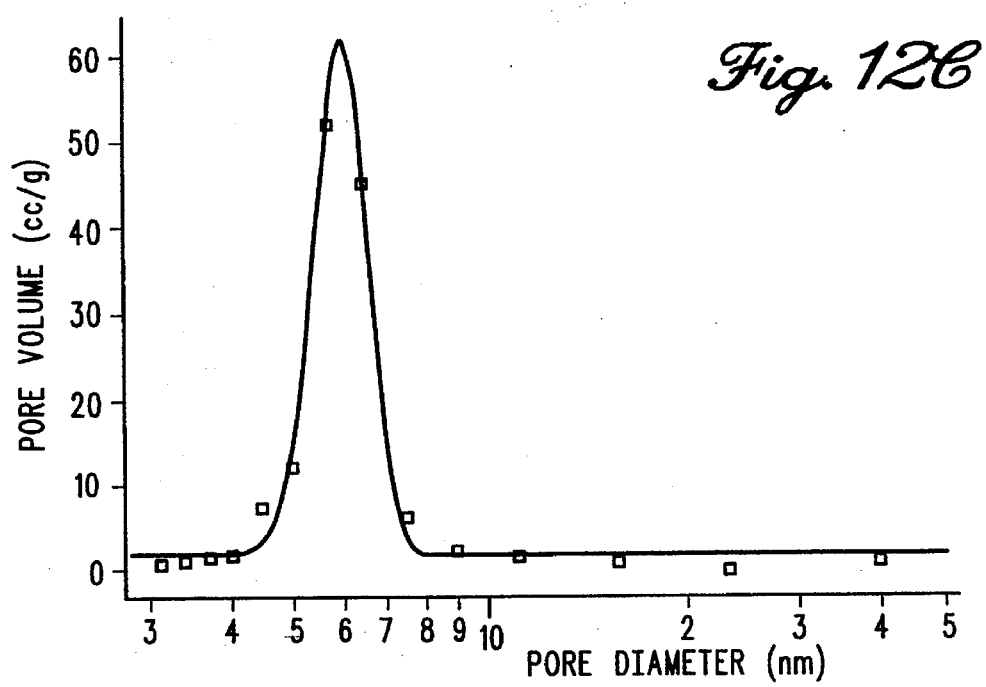
FIG. 12C shows the pore size spacing distribution for a nanocrystalline material prepared in accordance with the invention.

Consolidation testing establishes that the agglomeration of the nanocrystals is weak enough that agglomerates can be broken down by the mechanical energy generated in consolidation. The improvement of this invention over other nanocrystal material synthesis inventions can be best seen by reference to FIG. 12 which shows the pore size distribution, grain size distribution and regularity of pore spacing of titanium oxide. The data labeled "other" is from titanium oxide generated by the process described in U.S. Pat. No. 5,128,081. The unlabeled data is from titanium oxide generated by the process in this instant invention. As can be seen in FIG. 12A the TEM particle size distribution is much smaller and narrower using the process described in this invention. In FIG. 12B is shown that once the nanocrystals are consolidated, the pore distribution of the titanium oxide generated by the apparatus of this invention is much smaller than that which is generated by the process in U.S. Pat. No. 5,128,081. In FIG. 12C, the regularity of the pore spacing further demonstrates the reliability and reproducibility of the method of making the nanostructured material. It should also be noted that the production rate of the process in this invention is over one hundred times greater than the production rate compared to the method set forth in U.S. Pat. No. 5,128,081, making the instant method a commercially viable process.

An additional test of the agglomeration is the dispersion of untreated nanocrystal powders which is achieved by applying ultrasonic energy from a sonicating probe (0.2–1 Watts) to a liquid solution (water or ethylene glycol) that has a 5–50% weight loading of nanocrystals. The ultrasonic energy forms a colloidal dispersion that remains dispersed and in suspension for a minimum of five months. By treating the solution with additional liquids, the nanocrystals can remain in suspension for longer periods of time. This dispersion test determines whether the nanocrystal powders generated by the process described in this invention are weakly agglomerated and have high purity and clean particle surfaces.

The following nonlimiting examples set forth exemplary methods of preparing nanostructured materials.

EXAMPLES

EXAMPLE 1

A metal rod ⅛"–3" diameter of Ti, Al, Zr, Y, Fe, Cr, V, Cu, Si, Sn, or Zn, with a known starting purity (99–99.99% pure) was used as an anode in a transferred arc. The cathode was 2% thoriated-W electrode and was shielded by 25–100 cfh of a working gas of argon combined with 5–100% nitrogen and/or 5–50% hydrogen. The current of the arc ranges from 100–750 amps. The arc creates a plasma tail flame 1–4 inches long and evaporates the anode metal precursor. The 1–200 g/hr of metal vapor is injected into the plasma tail flame created by the transferred arc. In the plasma tail flame, particle nucleation proceeds; and 10–1000 cfh oxygen is injected into the tail flame to form a suboxide species of the starting metal. The presence of hydrogen from the working gas forms water vapor and produces a fully oxidized material. Further cooling causes metal-oxide ceramic particles to form due to the presence of oxygen and high temperature. Quench gas (1–1000 cfm), in the form of air or the individual components of air ($O_2$, $N_2$, $H_2$, $H_2O$, $CO_2$), were later added to further cool the particles and prevent hard agglomeration. The nanocrystalline powders are collected and typically have primary aggregate sizes of 1–50 nm and typical agglomerate sizes are 10–100 nm.

EXAMPLE 2

A metal rod ⅛"–3" diameter of Ti or Al with a known starting purity was used as an anode in a transferred arc. The cathode was a 2% thoriated-W electrode and was shielded by 25–100 cfh of a working gas of argon in combined with 5–100% nitrogen or 5–50% hydrogen. The current of the arc ranges from 100–750 amps. The arc creates a plasma tail flame 1–4 inches long and evaporates the anode metal precursor. The 1–200 g/hr of metal vapor was injected into the plasma tail flame created by the transferred arc. In the plasma tail flame, particle nucleation proceeds; and 10–400 cfh nitrogen was injected into the tail flame to form a nitride species of the starting metal. Further cooling causes nitride ceramic particles to form due to the presence of nitrogen and high temperature. Quench gas (1–1000 cfm), in the form of $N_2$, Ar or He was later added to further cool the particles and prevent hard agglomeration. The nanocrystalline powders were collected and typically have primary aggregate sizes of 1–50 nm and typical agglomerate sizes were 10–100 nm.

EXAMPLE 3

A metal powder was mixed in a 15–50 wt % loading with metal-oxide powder. The powders were then compounded into a rod ½"–3" diameter by pressing and sintering. The rod was electrically conductive and used as an anode in a transferred arc. The cathode was a 2% thoriated-W electrode and shielded by 25–100 cfh of a working gas of argon in combined with 5–100% nitrogen or 5–50% hydrogen. The current of the arc ranged from 100–750 amps. The anode was evaporated by the arc and 1–200 g/hr of the anode vapor was injected into the 1–4 inch long plasma tail flame created by the transferred arc. In the plasma tail flame particle nucleation proceeds, and 10–1000 cfh oxygen was injected into the tail flame to produce cooling and caused formation of metal-oxide ceramic particles. Quench gas (1–1000 cfm), in the form of air or the individual components of air ($O_2$, $N_2$, $H_2$, $H_2O$, $CO_2$), was later added to further cool the particles and prevent hard agglomeration. The nanocrystalline powders were collected and typically have primary aggregate sizes of 1–50 nm and typical agglomerate sizes were 10–100 nm.

EXAMPLE 4

Figure 12D:
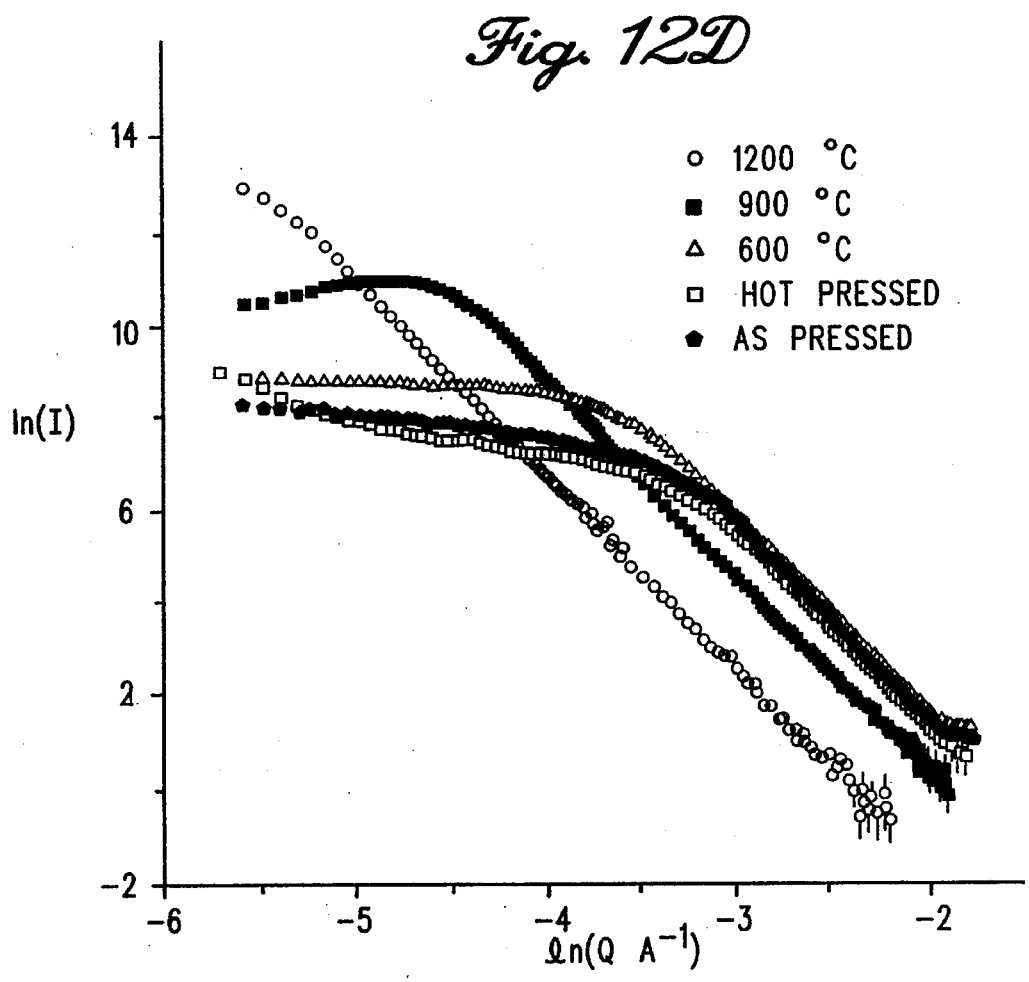
FIG. 12D shows the small angle neutron scattering characteristic of nanocrystalline material before treatment and after treatment to form the pore array of controlled spacing.

Nanocrystalline powder was made as in Example 1, was uniaxially consolidated in a die and punch arrangement with a pressure of 5–50 kpsi. The resulting bulk specimen has a density of 40–50% of its bulk theoretical value. The porosity in the compact has a narrow size distribution with pores ranging from 1–50 nm. If the consolidated specimen is heated to temperatures near 900° C., the porosity remains narrowly distributed and becomes ordered such that pore separation distance becomes constant throughout the sample. The ordering was detectable through the use of small angle neutron scattering (SANS), as shown in FIG. 12D. As shown in FIG. 12C, the ordering results in a well-defined distribution of pore spacings.

While preferred embodiments of the invention have been shown and described, it will be clear to those skilled in the art that various changes and modifications can be made without departing from the invention in its broader aspects as set forth in the claims provided hereinafter.

What is claimed is:

1. A method of synthesizing nanocrystalline material, comprising the steps of:

providing a chamber for holding means for generating a nanocrystalline aerosol selected from the group consisting of a metal, a semiconductor and a ceramic;

further providing a nonconsumable cathode having a longitudinal axis and shielded against chemical reaction by a working gas flow which also creates an elongated ionized arc, said working gas flow consisting essentially of a non-oxidizing gas including at least one of hydrogen gas and nitrogen gas and further including an inert gas;

further providing in the chamber a consumable anode inclined at an angle relative to the longitudinal axis of said cathode for providing material vaporizable from said anode by said elongated ionized arc;

providing first means for injecting a gas into the chamber;

using said first means to inject at least one of a quench and a reaction gas within the boundaries of said elongated ionized arc and causing truncation of said arc at a point of injection, thereby establishing an arc truncation point;

maintaining said arc between said cathode and anode by injecting the working gas and at least one of the quench and reaction gas into the chamber, and forming the nanocrystalline aerosol containing nanocrystals;

providing second means for injecting a gas into the chamber;

using said second means to inject a cooling gas stream into the nanocrystalline aerosol at a point downstream beyond said arc truncation point to prevent further substantial agglomeration of the nanocrystals; and cooling the nanocrystalline aerosol to form the nanocrystalline material.

2. The method as defined in claim 1 wherein said consumable anode is selected from the group consisting of chromium, aluminum, zirconium, yttrium, silicon, titanium and iron, and the nanocrystalline material resulting from the method is selected from the group consisting of stoichiometric silicon compounds of said reaction gas, stoichiometric titanium compounds of said reaction gas, and stoichiometric iron compounds of said reaction gas.

3. The method as defined in claim 2 wherein said reaction gas comprises art oxygen containing gas.

4. The method as defined in claim 2 wherein said reaction gas comprises a nitrogen containing gas.

5. The method as defined in claim 1 wherein a reaction zone having a first characteristic reaction zone color is formed near the intersection of the longitudinal axes of said anode and cathode with a first ionized arc disposed adjacent said cathode having a second characteristic color and said arc near said anode having a third characteristic color, said method of synthesizing nanocrystalline material being optimized for rate of production by generating a maximum color separation among the first, second and third characteristic colors formed during performance of the method.

6. The method as defined in claim 5 wherein the nanocrystalline material being formed consists essentially of an iron oxide and said reaction zone has a characteristic yellow color, said are near said cathode has a characteristic red color, and said are near said anode has a characteristic green color.

7. The method as defined in claim 1 wherein the nanocrystalline material has a grain size distribution of average size of about 8 nanometers and 18 nanometers for $ZrO_2$ and $Al_2O_3$, respectively.

8. The method as defined in claim 1 further including the step of forming consolidated material from the nanocrystalline material and wherein the consolidated material includes pores disposed between solid nanocrystalline grains and the pores have a characteristic pore size distribution associated with the consolidated material with said pore size distribution having an average diameter less than about 20 nanometers and the nanocrystalline grains having a size distribution with an average diameter less than about 50 nanometers.

9. The method as defined in claim 1 wherein at least one of flow rate of said working gas is controlled, flow rate of said quench and/or reaction gas is controlled and the location relative to the anode of the point of quench/reaction gas injection is controlled to vary the particle diameter of said nanocrystalline material.

10. The method as defined in claim 1 further including the steps of:

providing a cyclone for turbulent mixing to prevent agglomeration of said nanocrystalline aerosol produced in said reaction zone;

expanding the cyclonically mixed nanocrystalline material into a large volume chamber to cool the nanocrystalline material; and passing the cooled nanocrystalline material through filter media to separate the nanocrystalline material from the gas.

11. The method as defined in claim I wherein said working gas flow comprises an inert gas selected from the group consisting of He, Ar, Ne, Kr and Xe.

12. The method as defined in claim 11 wherein said working gas flow further includes a dissociable gas selected from the group consisting of nitrogen, hydrogen and mixtures thereof, 13. The method as defined in claim 12 wherein the dissociable gas consists essentially of 5–50% by volume hydrogen gas added to the working gas flow.

14. The method as defined in claim 1 wherein said at least one of the quench and the reaction gas is injected using a concentric gas injection geometry to allow homogeneous injection into said elongated ionized arc.

15. The method as defined in claim 1 wherein said quench and/or reaction gas comprises at least one of oxygen, nitrogen, helium, air and mixtures thereof.

16. The method as defined in claim 1 wherein the nanocrystalline material produced is further dispersed into an aqueous solution, the nanocrystalline material having aggregate sizes of 1–50 nm.

17. The method as defined in claim 1 wherein the synthesizing steps produce the nanocrystalline material with an efficiency of at least 35 kilowatt hours per kilogram of the nanocrystalline material.

18. The method as defined in claim 1 wherein said reaction gas comprises oxygen and said nanocrystalline material is selected from the group consisting of $TiO_2$, $ZrO_2$, $SiO_2$, $Si_3N_4$, SiC, and $Y_2O_3$.

19. The method as defined in claim 1 wherein said reaction gas comprises oxygen gas and said nanocrystalline material consists essentially of stoichiometric $Al_2O_3$.

20. The method as defined in claim 1 wherein said reaction gas comprises oxygen gas and said nanocrystalline material consists essentially of $Fe_2O_3$.

21. A method of synthesizing a controlled particle size range of a nanocrystalline material, comprising the steps of:

providing a chamber for holding means for generating a nanocrystalline aerosol selected from the group consisting of a metal, a semiconductor and a ceramic;

further providing a nonconsumable cathode having a longitudinal axis and shielded against chemical reaction by a working gas flow which also creates an elongated ionized arc, said working gas flow consisting essentially of a non-oxidizing gas including at least one of hydrogen gas and nitrogen gas and further including an inert gas;

further providing in the Chamber a consumable anode inclined at an angle relative to the longitudinal axis of said cathode for providing material vaporizable from said anode by said elongated ionized arc;

providing first means for injecting into the chamber at least one of a quench gas and a reaction gas within the boundaries of said elongated ionized arc and using said first means to inject at least one of the quench gas and the reaction gas into said arc at a point, thereby causing truncation of said arc at the point of injection into the arc;

using said first means for controlling gas flow rate to change the flow rate of at least one of said quench gas and said reaction gas to control and change the particle size range of the nanocrystalline material to be synthesized;

maintaining said arc between said cathode and anode by injecting the working gas and the at least one of quench and reaction gas with a controlled gas flow rate into the chamber to form the nanocrystalline aerosol; and cooling the nanocrystalline aerosol to form the controlled particle size range nanocrystalline material.

22. The method as defined in claim 21 further including the step of controlling particle size by injecting a cooling gas stream into the nanocrystalline aerosol at a point downstream beyond the truncation of said arc.

23. The method as defined in claim 21 wherein said reaction gas comprises an oxygen containing gas.

24. The method as defined in claim 21 wherein said working gas flow and said quench and reaction gas are introduced into said chamber as part of an open loop gas flow system.

25. The method as defined in claim 21 wherein said reaction gas comprises an oxygen containing gas and said nanocrystalline material is selected from the group consisting of $TiO_2$, $ZrO_2$, $Si_3N_4$, SiC, $SiO_2$, $Y_2O_3$, $Al_2O_3$ and $Fe_2O_3$.

26. The method as defined in claim 21 further including the step of dispersing the nanocrystalline material in a liquid solution to form a colloidal suspension.

27. The method as defined in claim 21 wherein a reaction zone having a first characteristic reaction zone color is formed near the intersection of the longitudinal axes of said anode and cathode with a first ionized arc disposed adjacent said cathode having a second characteristic color and said arc near said anode having a third characteristic color, said method of synthesizing nanocrystalline material being optimized for rate of production by generating a maximum color separation among the first, second and third characteristic colors formed during performance of the method.

28. The method as defined in claim 21 further including the step of forming consolidated material from the nanocrystalline material and wherein the consolidated material includes pores disposed between solid nanocrystalline grains and the pores have a characteristic pore size distribution associated with the consolidated material with said pore size distribution having an average diameter less than about 20 nanometers and the nanocrystalline grains having a size distribution with an average diameter less than about 50 nanometers.

29. The method as defined in claim 21 further including the steps of:

providing a cyclone for turbulent mixing to prevent agglomeration of said nanocrystalline aerosol produced in said reaction zone;

expanding the cyclonically mixed nanocrystalline material into a large volume chamber to cool the nanocrystalline material; and passing the cooled nanocrystalline material through filter media to separate the nanocrystalline material from the gas.

* * * * *